(No Model.)

T. O. THORSON.
GOPHER CULTIVATOR.

No. 375,514. Patented Dec. 27, 1887.

WITNESSES:
W. R. Davis
C. Sedgwick

INVENTOR:
T. O. Thorson
BY Munn & Co
ATTORNEYS.

UNITED STATES PATENT OFFICE.

THOR. O. THORSON, OF ELLIOTT, ILLINOIS, ASSIGNOR TO HIMSELF, MICHAEL W. PETERSON, AND PETER S. PETERSON, ALL OF SAME PLACE.

GOPHER CULTIVATOR.

SPECIFICATION forming part of Letters Patent No. 375,514, dated December 27, 1887.

Application filed June 7, 1887. Serial No. 240,529. (No model.)

*To all whom it may concern:*

Be it known that I, THOR. O. THORSON, of Elliott, in the county of Ford and State of Illinois, have invented a new and Improved Gopher Cultivator, of which the following is a full, clear, and exact description.

My invention relates to an improvement in gopher cultivators, and has for its object to provide an apparatus wherein the shovel will be adjustable in any direction.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1:
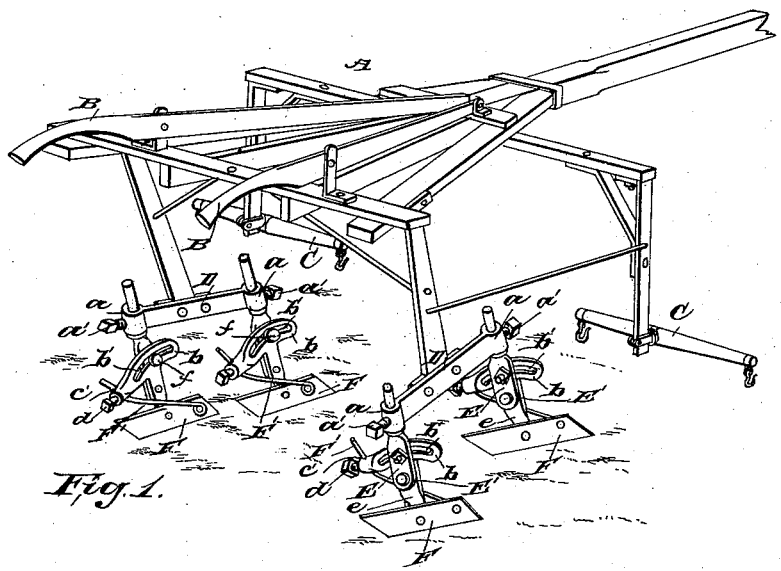
Figure 2:
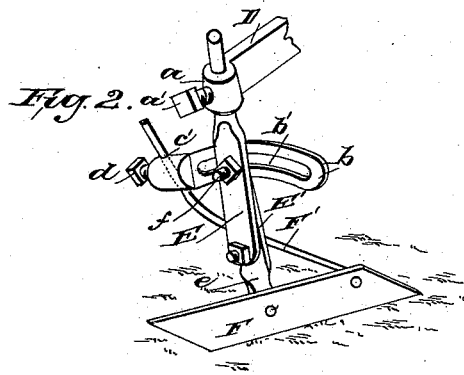

Figure 1 is a perspective view of the cultivator, and Fig. 2 is a perspective view of one shovel and connection.

In carrying out the invention, A represents the frame of a cultivator; B, the handle, and C the draft. From each side of the frame, at the rear, a horizontal beam, D, is suspended, provided with eyes $a$ at each end, the said eyes having a slight inclination rearward.

Within each eye $a$ the upper circular end of a shank, E, is inserted adjustably positioned by means of a set-screw, $a'$, and near the base of the shanks E an auxiliary shank, E', is pivoted, the upper end of which auxiliary shank is made to project upward parallel with the main shank E, having integral with its upper end a curved T-shaped arm, $b$, provided with a segmental slot, $b'$, extending from the rear end of said arm to within a short distance of the forward end, as shown in Fig. 2, the forward end of the arm being made solid and provided with a more or less vertical aperture, $c$, and a set-screw, $d$, entered at the end and passing at right angles with said aperture.

The lower end, $e$, of the auxiliary shank E' is given a half-twist, and to this twisted end a shovel, F, is centrally pivoted, to the outer end of which shovel one end of a curved bar, F', is secured. The other end of said bar, projecting upward through the aperture $c$, is retained therein by the set-screw $d$.

It will be readily observed that the shovels may be given any desired inclination that the nature of the ground and character of the work demands for successful cultivation, as the shovels are adjustable at any angle with the shanks through the segmental slot $b'$ and the set-screw $f$, passing through said slot into the main shank E and up or down through the bar F' and set-screw $d$, and also at an angle to the horizontal beam D by means of the reduced top and set-screw $a'$.

Having thus fully described my invention, what I claim as new, and desire to secure by Letters Patent, is—

1. In a cultivator, the combination, with the arm D, the shank E, adjustably supported in said arm, and the auxiliary shank E', provided with a slotted T-extension, $b$, and pivoted to said main shank, of the shovel F, pivoted to said auxiliary shank, and a curved bar, F', attached to said shovel and adjustably held in said T-extension, substantially as shown and described.

2. In a cultivator, the combination, with the arm D, the shank E, adjustably supported in said arm D, the auxiliary shank E', pivoted to said main shank, provided with a twisted lower end, an upper T-extension, $b$, having a segmental slot, $b'$, an aperture, $c$, and set-screw $d$, of the shovel F, pivoted to said auxiliary shank, and a rod, F', adjustably connecting said shovel and extension, substantially as shown and described.

THOR. O. THORSON.

Witnesses:
   HALWORD S. PETERSON,
   W. BIMBY.